United States Patent
Park

(10) Patent No.: US 8,233,036 B2
(45) Date of Patent: Jul. 31, 2012

(54) THREE-DIMENSIONAL IMAGE DISPLAY APPARATUS

(75) Inventor: Tae Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1489 days.

(21) Appl. No.: 11/797,459

(22) Filed: May 3, 2007

(65) Prior Publication Data

US 2007/0263088 A1  Nov. 15, 2007

(30) Foreign Application Priority Data

May 4, 2006  (KR) ......................... 10-2006-0040623

(51) Int. Cl.
- H04N 13/04 (2006.01)
- H04N 15/00 (2006.01)
- G06T 15/00 (2011.01)
- G03B 21/00 (2006.01)

(52) U.S. Cl. ................. 348/59; 348/42; 345/419; 353/7

(58) Field of Classification Search .............. 348/59, 348/42; 345/419; 353/7
See application file for complete search history.

(56) References Cited

U.S. PATENT DOCUMENTS

| | | | |
|---|---|---|---|
| 5,546,120 A * | 8/1996 | Miller et al. | 348/59 |
| 6,064,424 A * | 5/2000 | van Berkel et al. | 348/51 |
| 6,603,504 B1 * | 8/2003 | Son et al. | 348/54 |
| 6,801,243 B1 * | 10/2004 | Van Berkel | 348/59 |
| 6,825,985 B2 * | 11/2004 | Brown et al. | 359/619 |
| 7,443,392 B2 * | 10/2008 | Tsubaki | 345/419 |

FOREIGN PATENT DOCUMENTS

| | | |
|---|---|---|
| EP | 0 791 847 A1 | 8/1997 |
| EP | 1 455 540 A2 | 9/2004 |
| EP | 1 566 683 A1 | 8/2005 |
| JP | 2004-264858 A | 9/2004 |
| JP | 2005-309374 A | 11/2005 |
| KR | 10-2005-0060733 A | 6/2005 |
| WO | WO-2005/093494 A1 | 10/2005 |
| WO | WO 2006/042953 A1 | 4/2006 |
| WO | WO 2008/039004 A1 | 4/2008 |

\* cited by examiner

Primary Examiner — Ranodhi Serrao

(74) Attorney, Agent, or Firm — Birch, Stewart, Kolasch & Birch, LLP

(57) ABSTRACT

A three-dimensional image display apparatus having improved resolution and an expanded elementary three-dimensional space is disclosed. The three-dimensional image display apparatus includes a display device sampling, multiplexing, and displaying a plurality of parallax images so as to implement a three-dimensional image; and a lenticular lens plate provided on the front surface of the display device and having a vertical axis tilted from a vertical axis of the display device by a predetermined angle α. The number of parallax images included in an elementary three-dimensional image of the three-dimensional image is a multiple of 5.

15 Claims, 14 Drawing Sheets

POSITION OF GREEN PIXEL OF SECOND PARALLAX IMAGE $C_n$ : $n^{TH}$ CAMERA
$PV_n$ : $n^{TH}$ PARALLAX IMAGE

ELEMENTARY
THREE-DIMENSIONAL
SPACE

IF m=4

IF m=6

ELEMENTARY THREE-DIMENSIONAL IMAGE(28)

$$\frac{\text{AREA A}}{\text{AREA B}} = 0.83$$

ELEMENTARY THREE-DIMENSIONAL IMAGE(28)

$$\frac{\text{AREA A}}{\text{AREA B}} = 0.83$$

THREE-DIMENSIONAL IMAGE DISPLAY APPARATUS

This application claims the benefit of Korean Patent Application No. 10-2006-0040623, filed on May 4, 2006, which is hereby incorporated by reference as if fully set forth herein.

BACKGROUND OF THE INVENTION

1. Field of the Invention

The present invention relates to a three-dimensional image display apparatus, and more particularly, to a three-dimensional image display apparatus having improved resolution and an expanded elementary three-dimensional space.

2. Discussion of the Related Art

The present invention relates to a three-dimensional image display apparatus, and more particularly to, a three-dimensional image display apparatus of which resolution does not deteriorate although the number of parallax images used for implementing a three-dimensional image increases.

In general, different images are input to the left and right eyes of a viewer and are then combined in the brain of the viewer such that a three-dimensional image is perceived. In order to form such a three-dimensional image, a device for providing different images to the left and right eyes of the viewer is required. Conventionally, a linear polarization display apparatus which uses a pair of three-dimensional glasses for dividing an image into a left-eye image and a right-eye image was used. However, such a linear polarization display apparatus is inconvenient in that the viewer must wear the three-dimensional glasses.

Accordingly, in order to solve such a problem, methods which form a three-dimensional image without using glasses were suggested. In these methods, a three-dimensional image display apparatus is configured by combining a flat display device, such as a liquid crystal display panel (LCD) and a plasma display panel (PDP), and a device for dividing an image by different angles viewed by the viewer. Depending upon the device for dividing the image by the different angles viewed by the viewer, a wide range of methods, such as a lenticular method using a lenticular lens sheet, a parallax barrier method using a slit array sheet, an integral photography method using a micro-lens array sheet, and a holography method using a disturbance effect, can be proposed.

Among them, the parallax barrier method is disadvantageous in that most of light is blocked by slits and thus the brightness of the screen decreases. The integral photography method and the holography method are unlikely to be implemented because a massive amount of data must be processed. Accordingly, recently, the lenticular method is attracting attention.

FIG. 1 is a view showing a conventional three-dimensional image display apparatus using the lenticular method. As shown in FIG. 1, the three-dimensional image display apparatus using the lenticular method includes a flat display device 10 for displaying a plurality of parallax images and a lenticular lens plate 12 provided on the front surface of the flat display device 10. The lenticular lens plate 12 is provided such that the vertical axis thereof is parallel to the vertical axis of the flat display device 10, and is spaced apart from the flat display device 10 by a predetermined distance such that an image is mainly laid on a focus surface of a lenticular lens.

However, the conventional three-dimensional image display apparatus has the following problems.

As shown in FIG. 1, in the conventional three-dimensional image display apparatus using the lenticular method using four images, vertical resolution is equal to that of the parallax images before sampling, but horizontal resolution is reduced to ¼ of the resolution of the parallax images before sampling. That is, as shown in FIG. 2, in the conventional lenticular method, the horizontal resolution is reduced to 1/n (n: number of parallax images).

When the flat display device 10 for displaying the plurality of parallax images is implemented by an LCD in the three-dimensional image display apparatus, the following problems occur. As shown in FIGS. 3A and 3B, as the size of the LCD increases and the LCD and polarization plates (not shown) provided on the front and rear surfaces of the LCD are different from each other in thermal expansion or contraction characteristics, the LCD may be curved forward or backward. In addition, a distance l between a three-dimensional filter such as the lenticular lens plate 12 and the flat display device 10 such as the LCD is not uniform over the whole screen and the three-dimensional effect significantly deteriorates.

SUMMARY OF THE INVENTION

Accordingly, the present invention is directed to a three-dimensional image display apparatus that substantially obviates one or more problems due to limitations and disadvantages of the related art.

An object of the present invention is to provide a three-dimensional image display apparatus which is capable of expanding an elementary three-dimensional space while minimizing the deterioration of resolution by adjusting a pattern for multiplexing a plurality of parallax images and the tilt angle of the lenticular lens plate.

Another object of the present invention is to provide a three-dimensional image display apparatus which is capable of preventing a liquid crystal display panel used in the three-dimensional image display apparatus from being curved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a three-dimensional image display apparatus includes a display device sampling, multiplexing, and displaying a plurality of parallax images so as to implement a three-dimensional image; and a lenticular lens plate provided on the front surface of the display device and having a vertical axis tilted from a vertical axis of the display device by a predetermined angle $\alpha$, wherein the number of parallax images included in an elementary three-dimensional image of the three-dimensional image is a multiple of 5.

In another aspect of the present invention, a three-dimensional image display apparatus includes a display device sampling, multiplexing, and displaying a plurality of parallax images so as to implement a three-dimensional image; and a lenticular lens plate provided on the front surface of the display device and having a vertical axis tilted from a vertical axis of the display device by a predetermined angle $\alpha$, wherein the number of parallax images included in an elementary three-dimensional image of the three-dimensional image is a multiple of 7.

In another aspect of the present invention, a three-dimensional image display apparatus includes a liquid crystal display panel (LCD) sampling, multiplexing, and displaying a plurality of parallax images so as to implement a three-dimensional image; a three-dimensional image filer provided on the front surface of the LCD, for dividing the plurality of parallax images, and a flat support plate provided on at least one of the front and rear surfaces of the LCD, for supporting the LCD in a plane.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
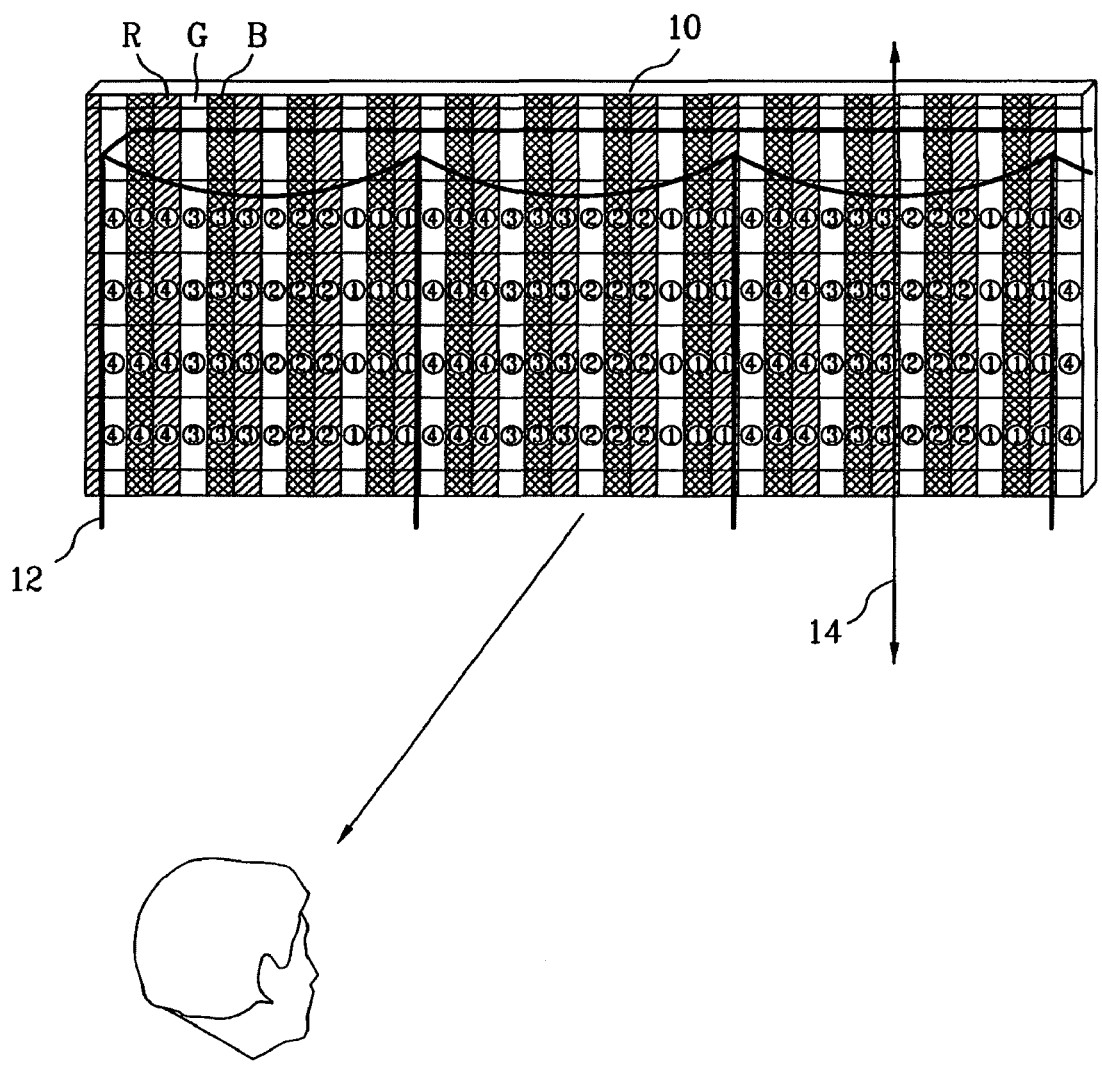
FIG. 1 is a view showing a conventional three-dimensional image display apparatus using a lenticular method.
Figure 2:
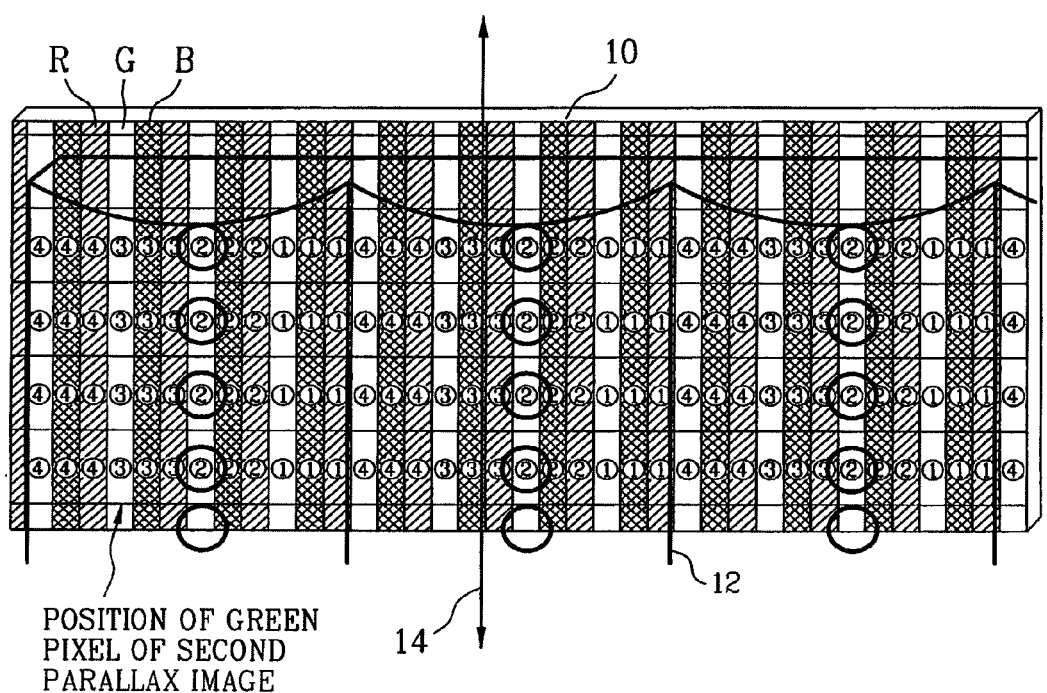
FIG. 2 is a view showing the deterioration of the resolution of the three-dimensional image display apparatus shown in FIG. 1.
Figure 3A:
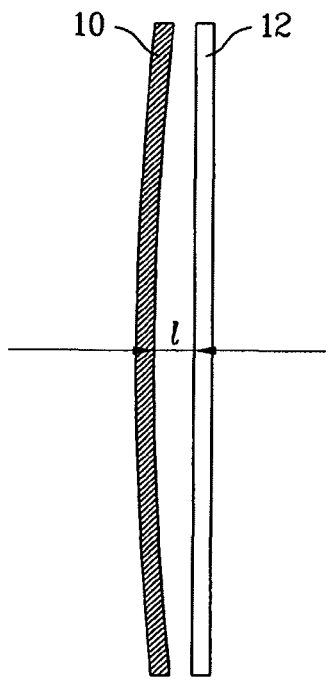
FIGS. 3A and 3B are views showing states that an LCD is curved in a case where a flat display device is implemented by the LCD.
Figure 3B:
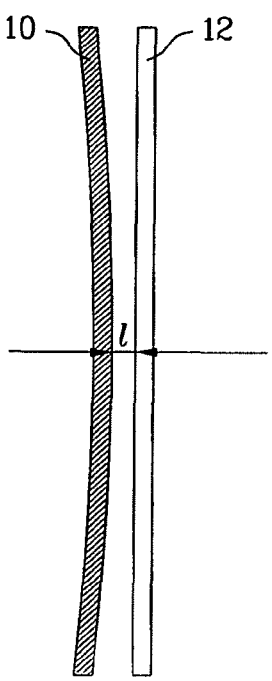
Figure 4:
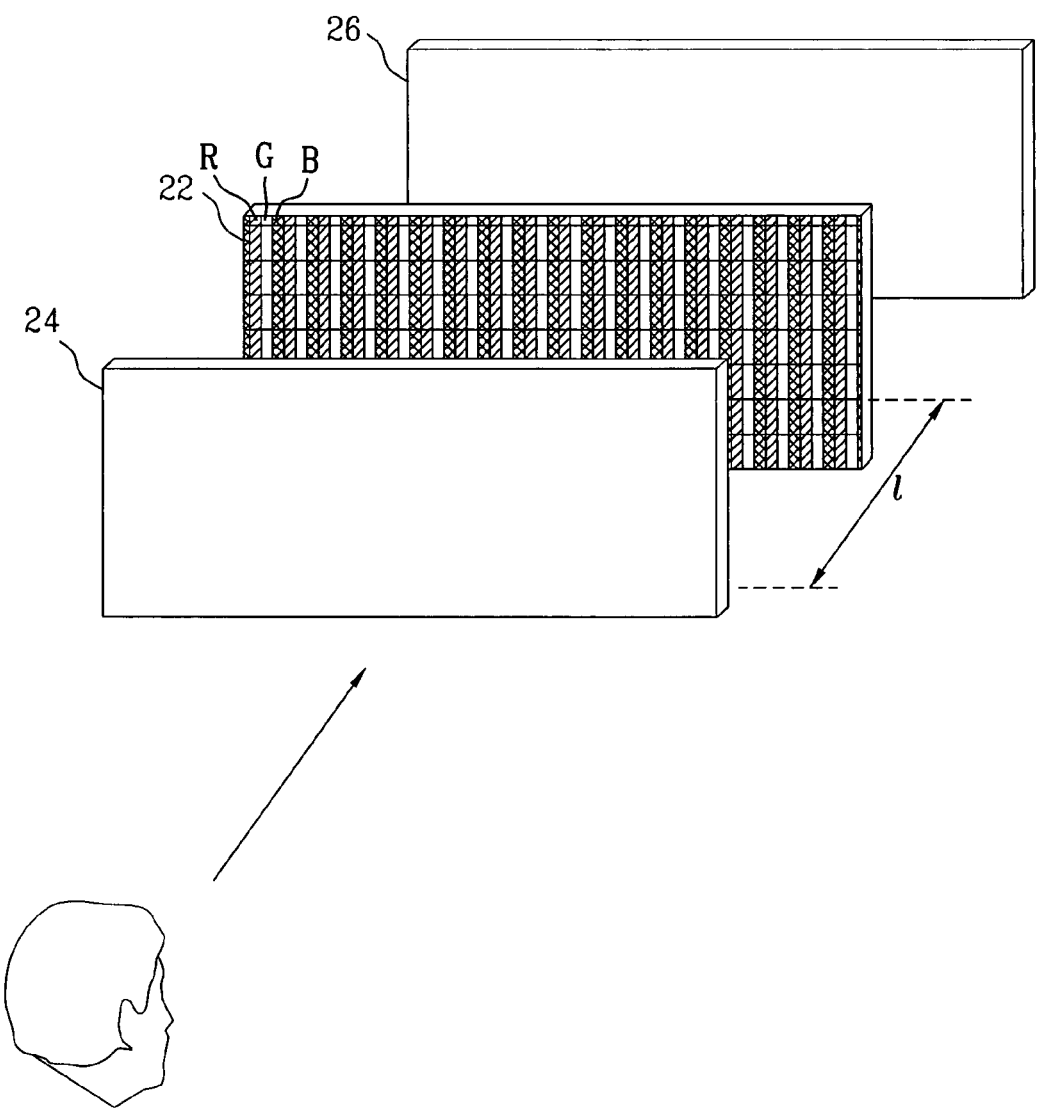
FIG. 4 is a view showing an embodiment of a three-dimensional image display apparatus according to the present invention.

FIG. 4 is a view showing an embodiment of a three-dimensional image display apparatus according to the present invention. As shown in FIG. 4, the three-dimensional image display apparatus according to the present invention includes a flat display device 22 for sampling, multiplexing, and displaying a plurality of parallax images and a lenticular lens plate 24 provided on the front surface of the flat display device 22, for dividing the plurality of parallax images. The lenticular lens plate 24 is spaced apart from the flat display device 22 by a predetermined distance l such that an image is laid on a focus surface of the lenticular lens. The flat display device 22 may be implemented by an LCD or a PDP. When the flat display device 22 is implemented by the LCD as shown in FIG. 4, the three-dimensional image display apparatus further includes a backlight 26 as a light source. This is because the LCD cannot self-emit light.

In the present invention, in order to solve the deterioration of horizontal resolution, a method of arranging a lenticular lens such that the vertical axis of the lenticular lens is tilted from the vertical axis of the display device by a predetermined angle $\alpha$ is suggested.

Figure 5:
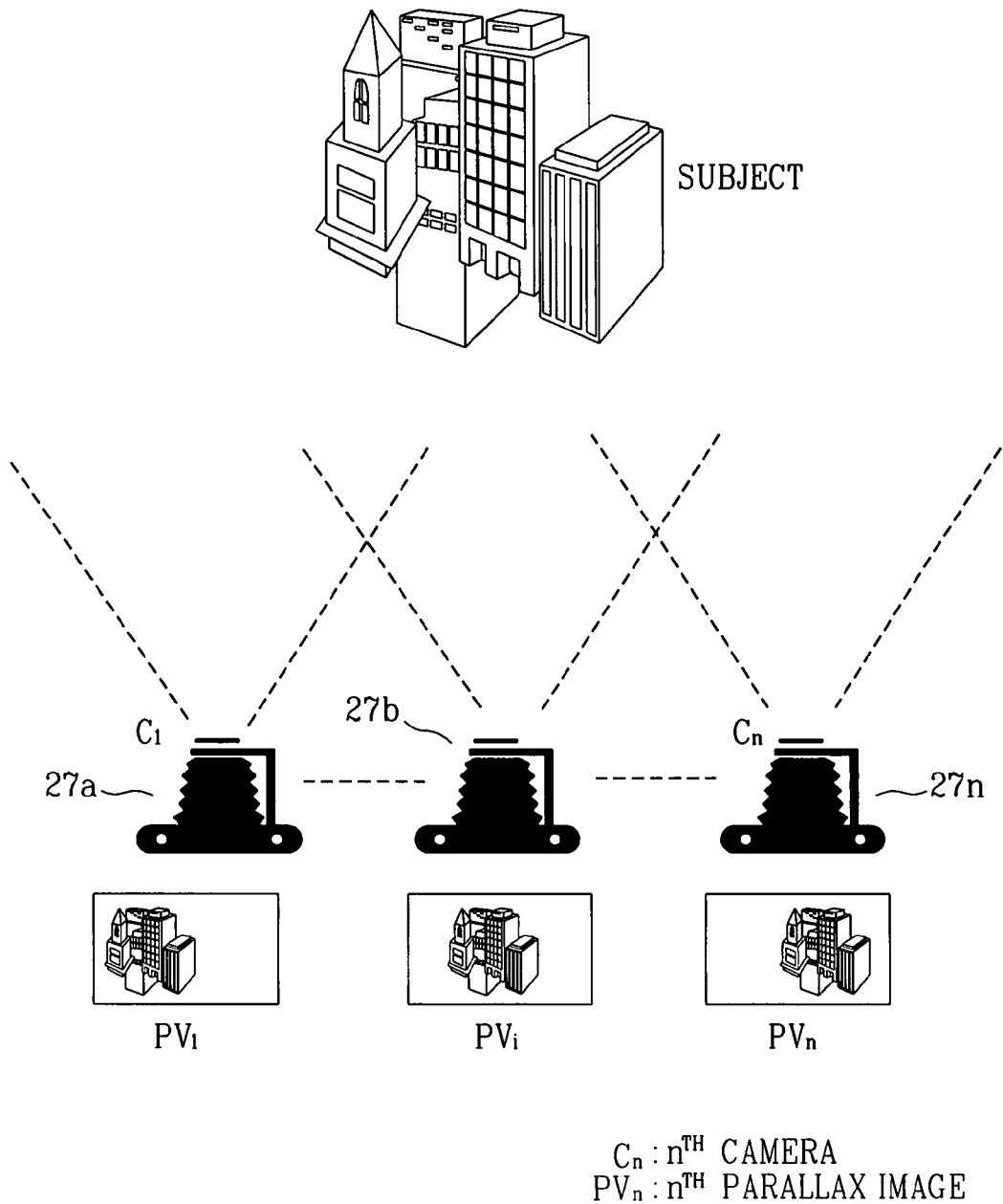
FIG. 5 is a view showing a process of generating a plurality of parallax images.

The plurality of parallax images are generated by acquiring n parallax images PV1, PV2, ..., PVn using n cameras $C_1$, $C_2$, ..., $C_n$ (27a, 27b, ..., 27n), as shown in FIG. 5. The n parallax images are sampled and multiplexed by a predetermined pattern to configure an elementary three-dimensional image.

Figure 6:
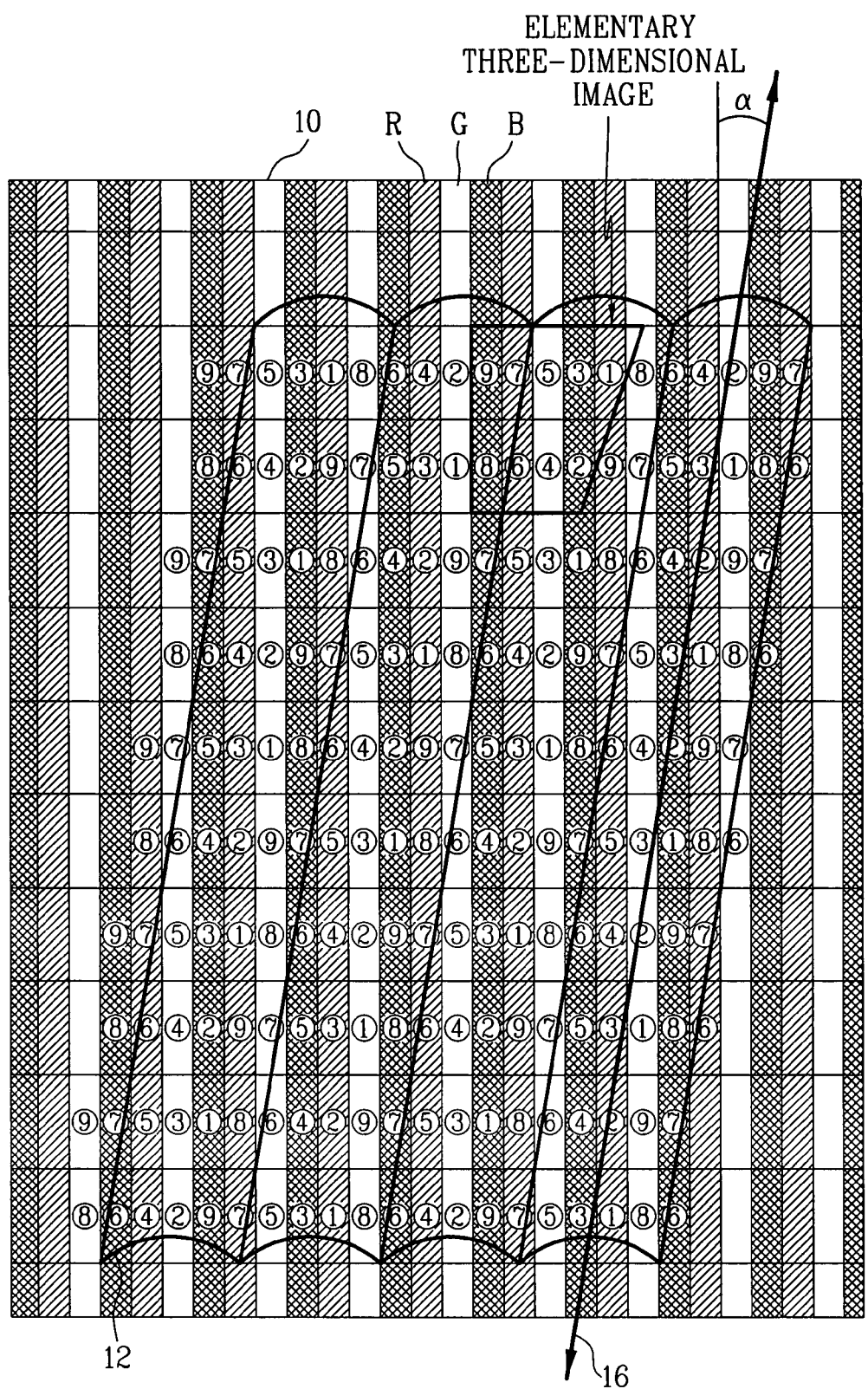
FIGS. 6 and 7 are views illustrating the resolution of the three-dimensional image display apparatus according to the present invention.
Figure 7:
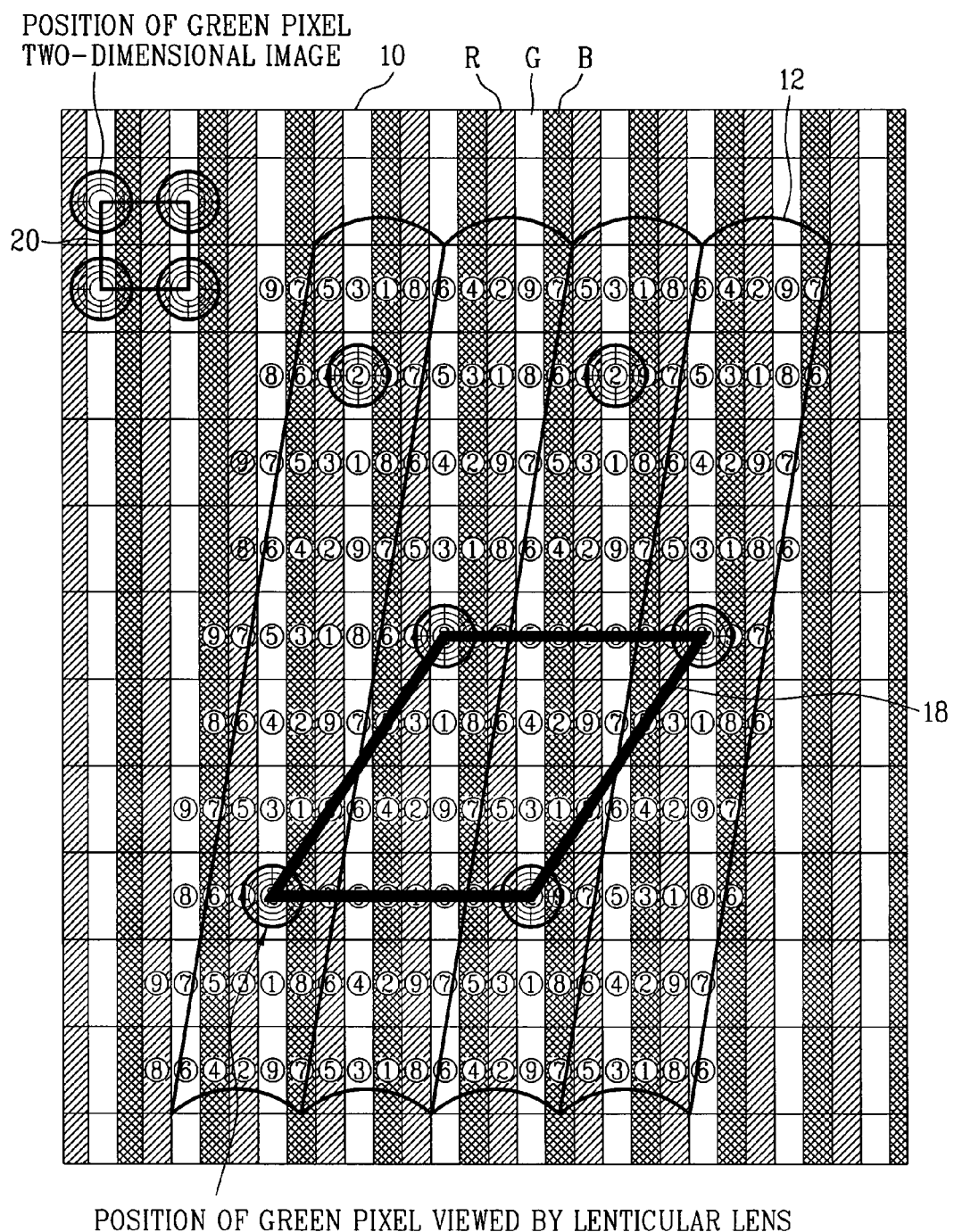

FIG. 6 is a view showing the resolution of the embodiment of the three-dimensional image display apparatus according to the present invention. In FIG. 6, the lenticular lens 12 is provided such that the vertical axis 16 of the lenticular lens 12 is tilted by the predetermined angle $\alpha$. A method of improving the horizontal resolution at the sacrifice of the vertical resolution is suggested. In FIG. 7, nine parallax images are used for implementing a three-dimensional image. As shown, the horizontal resolution is reduced to about ⅓ of the resolution of a conventional two-dimensional image, instead of ⅑ of the resolution of the conventional two-dimensional image. However, the vertical resolution is reduced to about ⅓ of the resolution of the conventional method which did not deteriorate. That is, the deterioration of the horizontal/vertical resolution is in balance and thus a viewer feels that image quality is improved compared with the conventional method. At this time, the tilt angle $\alpha$ of the lenticular lens is defined by Equation 1.

$$\alpha = \arctan(Hp/VpR) \qquad \text{Equation 1}$$

where, Hp denotes a subpixel period in a horizontal direction, Vp denotes a subpixel period in a vertical direction, and R denotes the number of rows used in an array of plural images, which is an integer of 2 or more.

For example, the lenticular lens plate 12 is tilted such that $\alpha$ becomes 9.4° or 6.3°. A parallelogram 18 shown in FIG. 7 represents unit resolution in the method of tilting the lenticular lens and a rectangle 20 represents unit resolution in a two-dimensional image.

In the present invention, in order to maximize the size an elementary three-dimensional space while minimizing the deterioration of the resolution, the lenticular lens plate 24 shown FIG. 4 is provided on the front surface of the flat display device 22 to be tilted by the predetermined angle $\alpha$. The predetermined angle is set by adjusting the pattern for multiplexing the plurality of parallax images in one elementary three-dimensional image for forming the three-dimensional image. That is, in the present invention, it is possible to minimize the deterioration of the resolution by increasing the number of parallax images to increase the size of the elementary three-dimensional space and adjusting the tilt angle of the lenticular lens plate 24 and the pattern for multiplexing the parallax images.

When the three-dimensional image is viewed using the three-dimensional image display apparatus using the lenticular lens method, there is a region for allowing a viewer to optimally view the image, which is called an elementary three-dimensional space. Accordingly, as the size of the elementary three-dimensional space increases, a space for allowing the viewer to normally view the three-dimensional image without pseudoscopic vision expands. The size of the elementary three-dimensional space is represented by the horizontal length L of the elementary three-dimensional space and the horizontal length L is calculated by Equation 2.

$$L = m \times d \qquad \text{Equation 2}$$

where, m denotes the number of parallax images included in the elementary three-dimensional image and d denotes the length of the elementary three-dimensional space corresponding to one parallax image.

Figure 8A:
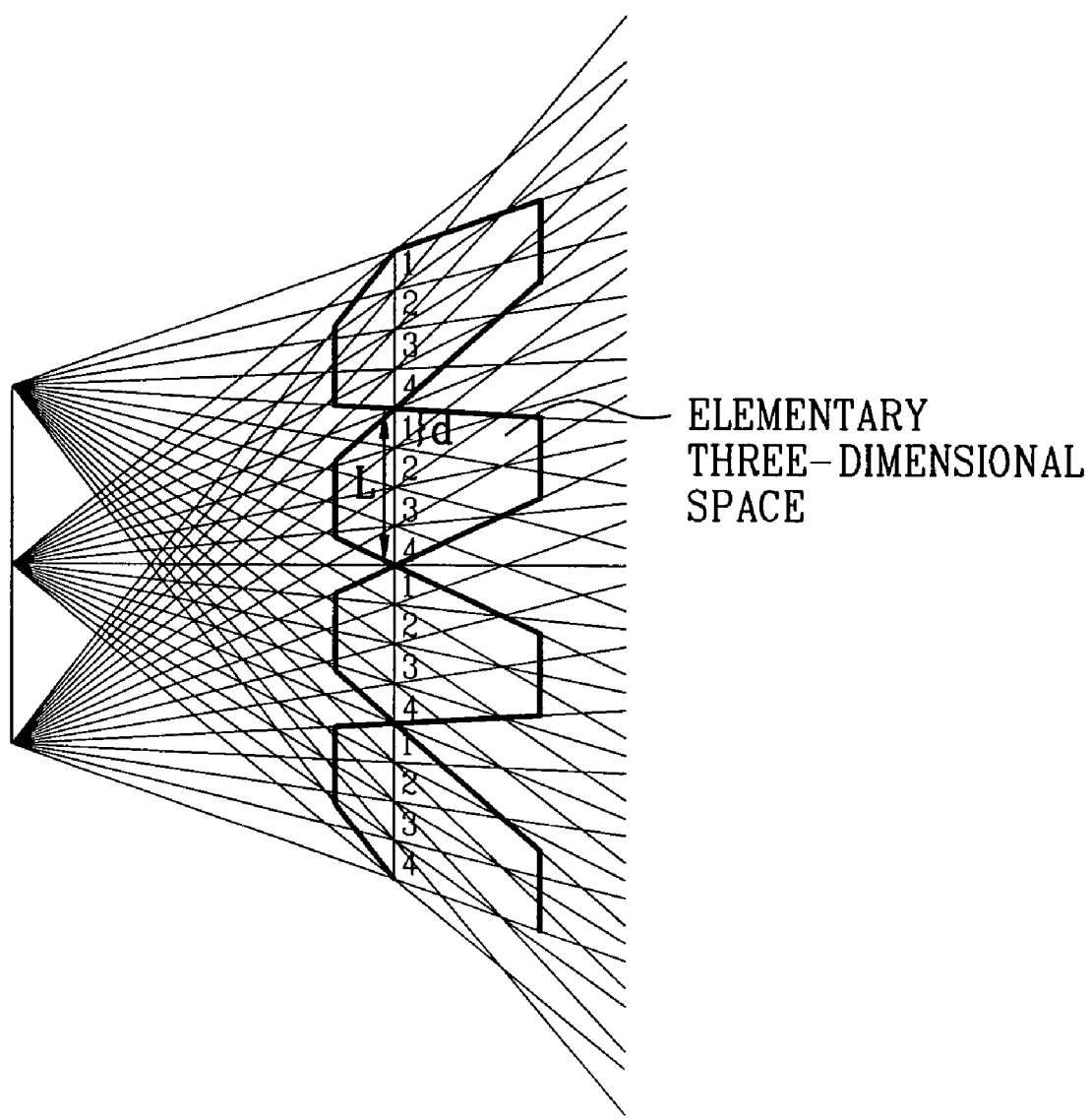
FIGS. 8A and 8B are views showing an elementary three-dimensional space in a three-dimensional image display apparatus using a lenticular method.
Figure 8B:
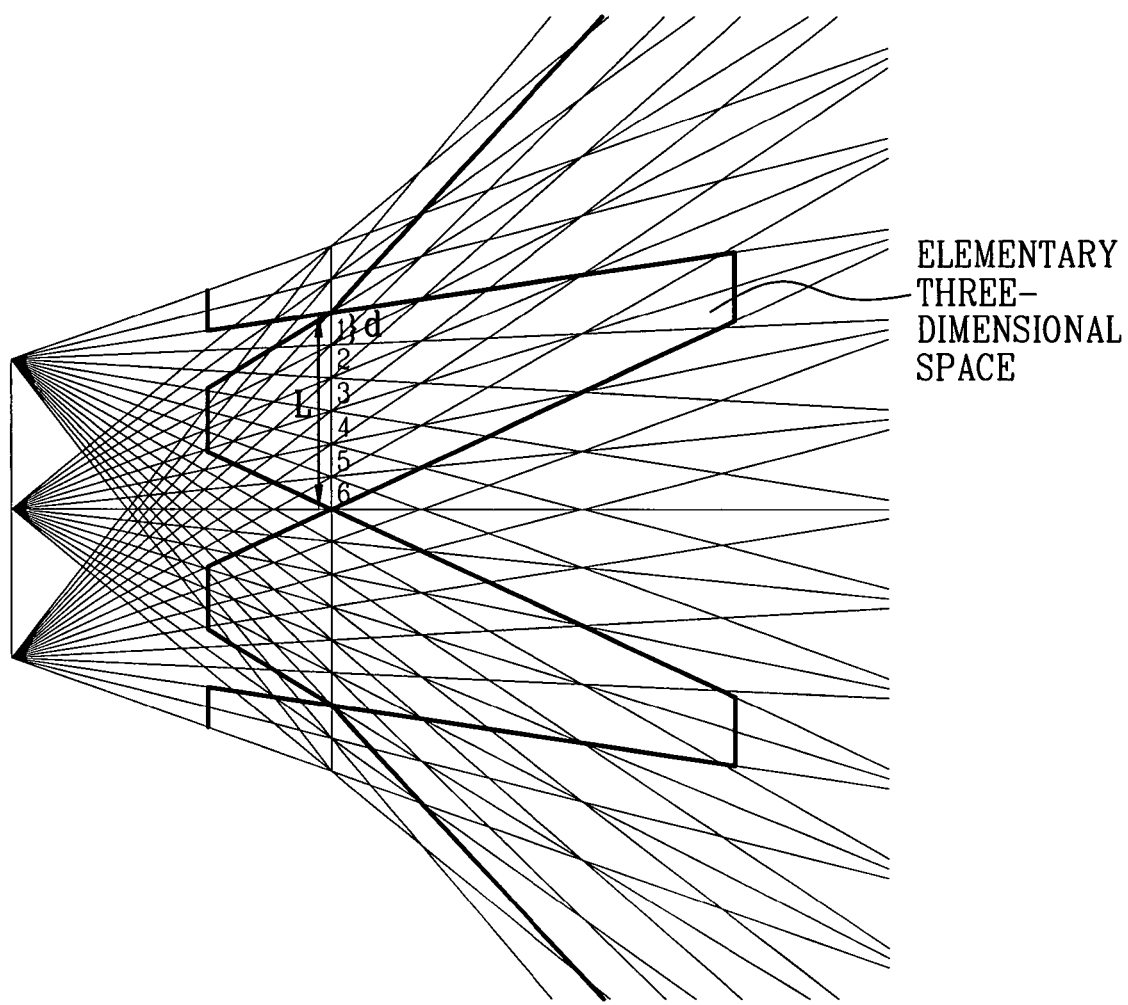

Accordingly, it can be seen that L must increase in order to increase the size of the elementary three-dimensional space and the number m of parallax images or the length D of the elementary three-dimensional space corresponding to one parallax image must increase in order to increase L. This will be described in detail with reference to FIG. 8. FIG. 8A shows a case where four parallax images are used (m=4) and FIG. 8B shows a case where six parallax images are used (m=6). As can be seen from FIGS. 8A and 8B, L increases if d or m increases and the elementary three-dimensional space expands if L increases.

However, since d must be smaller than a distance between the both eyes of the viewer, there is a limitation in increasing d. Thus, m must increase. However, when m increases, the resolution deteriorates. Accordingly, in the three-dimensional image display apparatus using the lenticular method, the elementary three-dimensional space must expand without deteriorating the resolution.

Hereinafter, the embodiments of the three-dimensional image display apparatus according to the present invention will be described according to the tilt angle of the lenticular lens plate and the pattern for multiplexing the parallax images.

Figure 9:
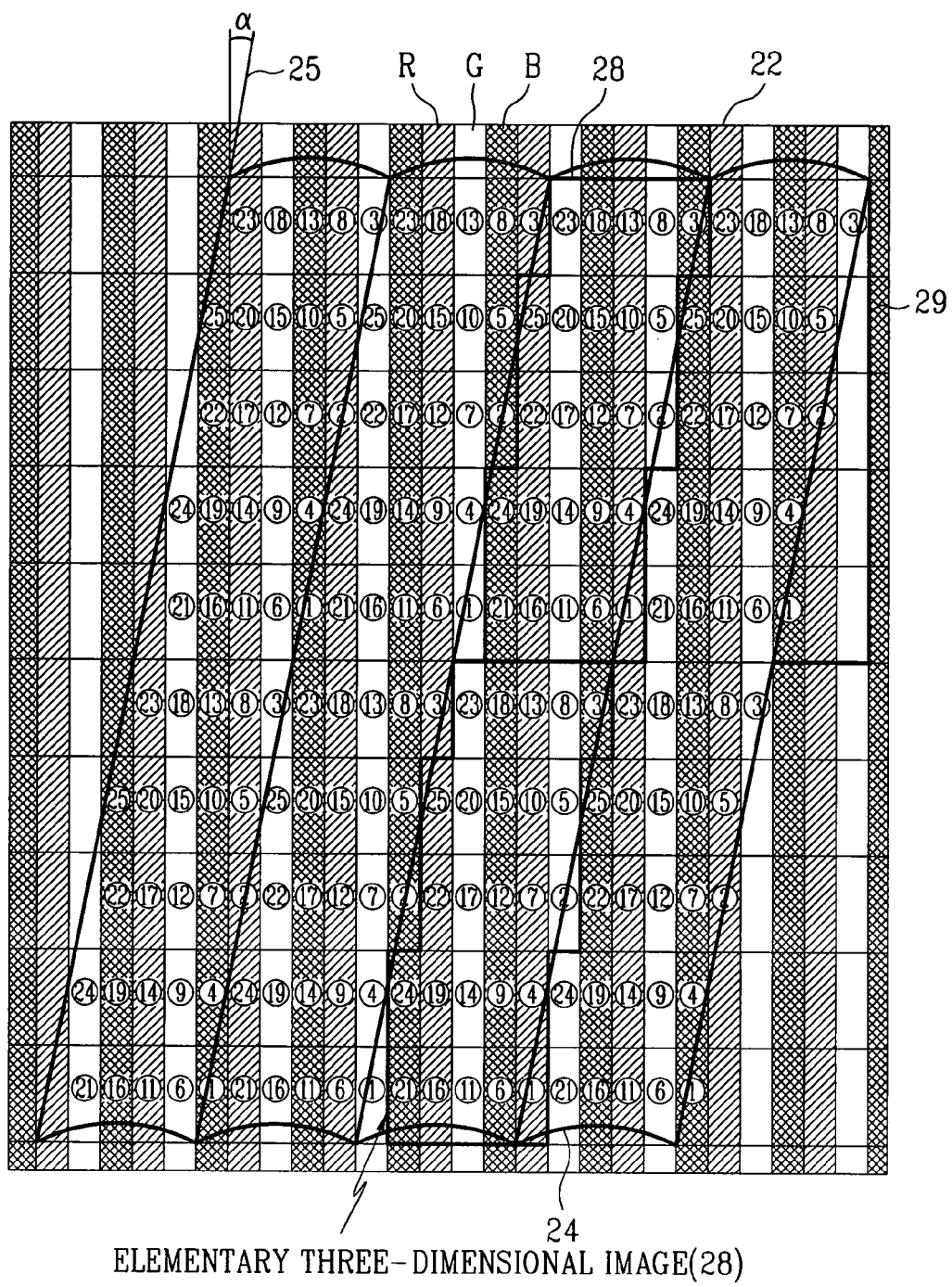
FIG. 9 is a view showing a first embodiment of the three-dimensional image display apparatus according to the present invention.

FIG. 9 is a view showing a first embodiment of the three-dimensional image display apparatus according to the present invention. As shown in FIG. 9, an elementary three-dimensional image 28 is generated using 5m (m is a natural number) parallax images. In the present embodiment, the number of parallax images used for generating the elementary three-dimensional image is 25, 30, 35, 40 or 45. Among them, the number of parallax images is most preferably 25 or 40 in consideration of optimal resolution. Hereinafter, for convenience of description, the elementary three-dimensional image configured using 25 parallax images will be described.

As shown in FIG. 9, the elementary three-dimensional image 28 composed of 25 parallax images is repeatedly arranged on the flat display device 22 in the horizontal direction. In the vertical direction, the elementary three-dimensional image 28 is repeatedly arranged while being shifted in the left direction by 3 subpixels. The 25 parallax images arranged in one elementary three-dimensional image are arranged in the subpixels arranged in an array of five rows and five columns according to a predetermined rule. The 25 parallax images are sequentially arranged by repeatedly applying a pattern in which first five parallax images are arranged.

In detail, the parallax images arranged at the leftmost side of each row are $23^{rd}$, $25^{th}$, $22^{nd}$, $24^{th}$ and $21^{st}$ parallax images which are sequentially arranged from an uppermost side to a lowermost side. The sequence number of the parallel image decreases by 5 from the left side to the right side in each row. That is, within one elementary three-dimensional image, if a $15^{th}$ parallax image is arranged in any subpixel, a $10^{th}$ parallax image is arranged at the right side thereof.

In more detail, among the subpixels of the elementary three-dimensional image, $23^{rd}$, $18^{th}$, $13^{th}$, $8^{th}$ and $3^{rd}$ parallax images are arranged in the subpixels of a first row from the left side to the right side, $25^{th}$, $20^{th}$, $15^{th}$, $10^{th}$ and $5^{th}$ parallax images are arranged in the subpixels of a second row, which are shifted from the subpixels of the first row in the left direction by one subpixel, from the left side to the right side, $22^{nd}$, $17^{th}$, $12^{th}$, $7^{th}$ and $2^{nd}$ parallax images are arranged in the subpixels of a third row from the left side to the right side, $24^{th}$, $19^{th}$, $14^{th}$, $9^{th}$ and $4^{th}$ parallax images are arranged in the subpixels of a fourth row, which are shifted from the subpixels of the third row in the left direction by one subpixel, from the left side to the right side, and $21^{st}$, $16^{th}$, $11^{th}$, $6^{th}$ and $1^{st}$ parallax images are arranged in the subpixels of a fifth row from the left side to the right side.

When the parallax images are arranged as shown in FIG. 9, the vertical axis 25 of the lenticular lens plate 24 must be tilted from the vertical axis of the flat display device 22 by the predetermined angle α in order to display the 25 parallax images using one lenticular lens without deteriorating the resolution. At this time, the tilt angle α of the vertical axis 25 of lenticular lens plate 24 may be calculated using a triangle 29 shown in FIG. 9 and is expressed by Equation 3.

$$\alpha = \arctan(3Hp/5Vp) \qquad \text{Equation 3}$$

where, Hp denotes a subpixel period in the horizontal direction and Vp denotes a subpixel period in the vertical direction.

At this time, one lenticular lens 24a included in the lenticular lens plate 24 is formed in correspondence with five subpixels arranged in the horizontal direction.

Although the elementary three-dimensional image 28 is configured using the 25 parallax images in the present embodiment, the elementary three-dimensional image may be configured using 40 parallax images in a modified embodiment. At this time, the elementary three-dimensional image configured using the 40 parallax images is repeatedly arranged on the flat display device 22 in the horizontal direction, similar to the elementary three-dimensional image 28 configured using the 25 parallax images. In the vertical direction, the elementary three-dimensional image is repeatedly arranged while being shifted in the left direction by three subpixels. The 40 parallax images arranged in the elementary three-dimensional image are arranged in the subpixels arranged in an array of five rows and eight columns. At this time, one lenticular lens included in the lenticular lens plate has a width corresponding to eight subpixels in the horizontal direction. A method of arranging the 40 parallax images in the subpixels will be described.

In detail, the parallax images arranged at the leftmost side of each row are $38^{th}$, $40^{th}$, $37^{th}$, $39^{th}$ and $36^{th}$ parallax images which are sequentially arranged from an uppermost side to a lowermost side. The sequence number of the parallel image decreases by 5 from the left side to the right side in each row. That is, within one elementary three-dimensional image, if a $35^{th}$ parallax image is arranged in any subpixel, a $30^{th}$ parallax image is arranged at the right side thereof.

In more detail, among the subpixels of the elementary three-dimensional image, $38^{th}$, $33^{rd}$, $28^{th}$, $23^{rd}$, $18^{th}$, $13^{th}$, $8^{th}$ and $3^{rd}$ parallax images are arranged in the subpixels of a first row from the left side to the right side, $40^{th}$, $35^{th}$, $30^{th}$, $25^{th}$, 20th, 15th, 10th and 5th parallax images are arranged in the subpixels of a second row, which are shifted from the subpixels of the first row in the left direction by one subpixel, from the left side to the right side, 37th, 32nd, 27th, 22nd, 17th, 12th, 7th and 2nd parallax images are arranged in the subpixels of a third row from the left side to the right side, 39th, 34th, 29th, 24th, 19th, 14th, 9th and 4th parallax images are arranged in the subpixels of a fourth row, which are shifted from the subpixels of the third row in the left direction by one subpixel, from the left side to the right side, and 36th, 31st, 26th, 21st, 16th, 11th, 6th and 1st parallax images are arranged in the subpixels of a fifth row from the left side to the right side, thereby arranging the 40 parallax images in the subpixels.

Figure 10:
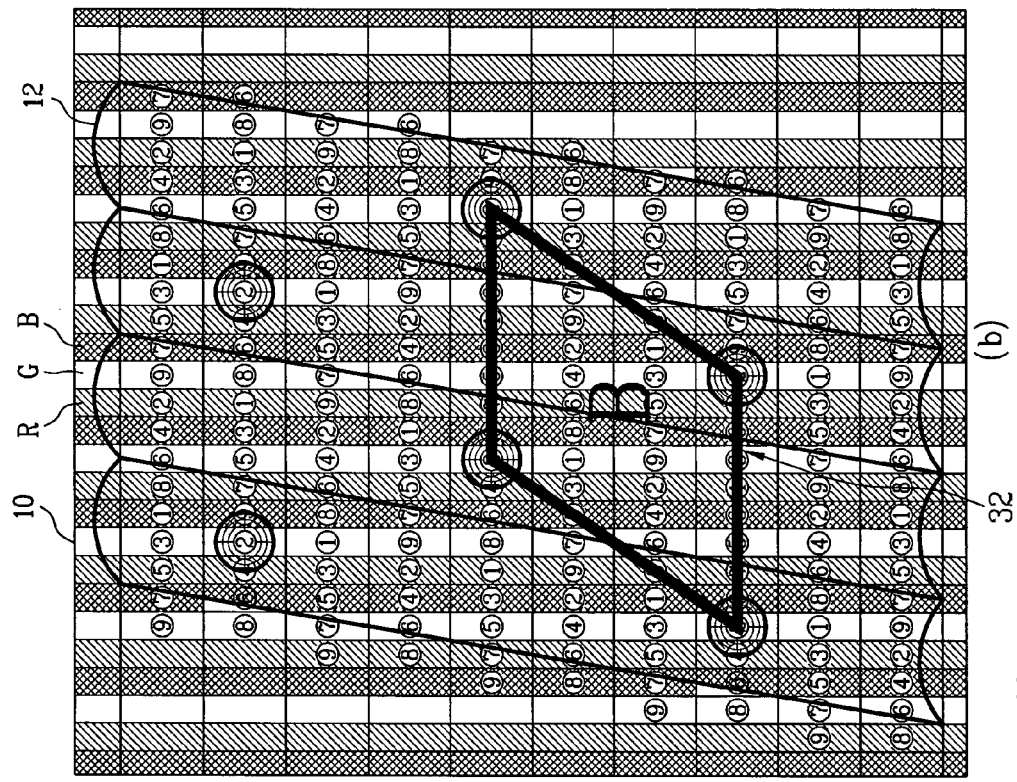
FIGS. 10(a) and 10(b) are views showing the comparison between the resolution of the first embodiment of the three-dimensional image display apparatus according to the present invention and the resolution of the conventional three-dimensional image display apparatus.
Figure 10:
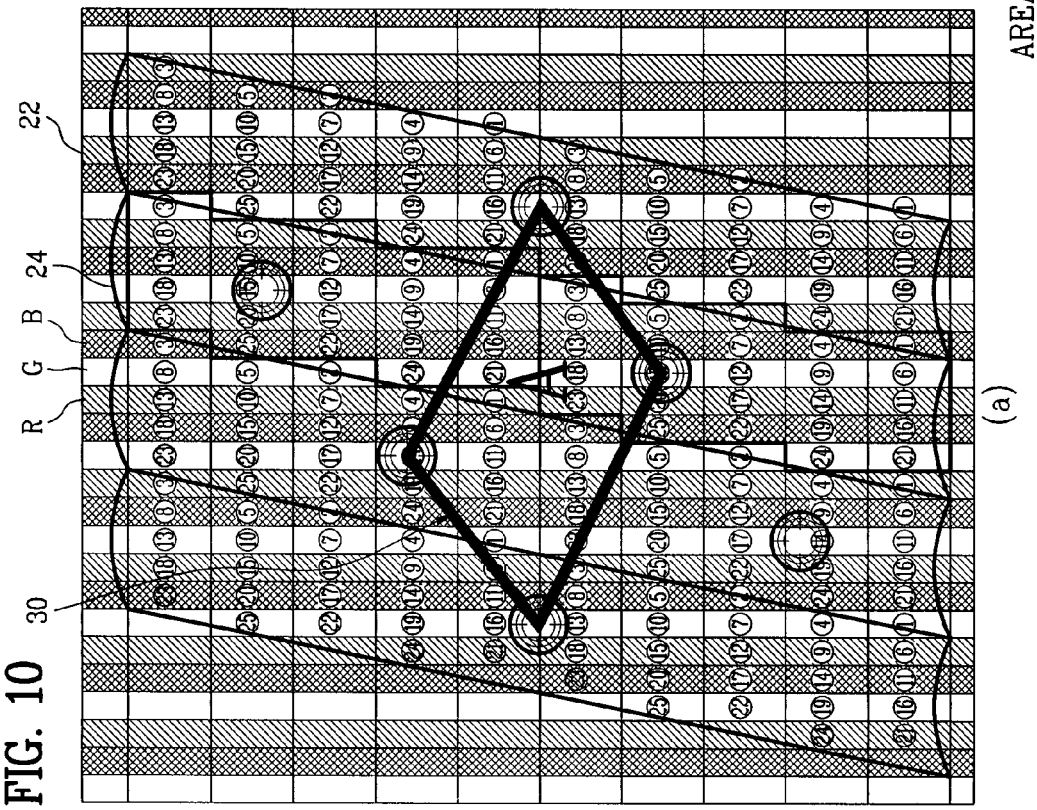

FIG. 10 is a view showing the comparison between the resolution of the present embodiment and the resolution of the conventional three-dimensional image display apparatus. FIG. 10A shows a case where the elementary three-dimensional image is configured using 25 parallax images and the lenticular lens plate 24 is tilted by the angle calculated by Equation 3, according to the first embodiment of the present invention. FIG. 10B shows a case where the elementary three-dimensional image is configured using 9 parallax images and the lenticular lens plate 12 is tilted by the angle calculated by Equation 1, according to the conventional three-dimensional image display apparatus. In FIGS. 10A and 10B, rectangles 30 and 32 indicate unit resolutions due to the effects of the lenticular lens plates 24 and 12, respectively. As an area A or B decreases, resolution increases.

As shown, since the area A of the unit resolution of the apparatus according to the present invention using the 25 parallax images is about 83% of the area B of the unit resolution of the conventional apparatus using the 9 parallax images, it can be seen that the resolution of the three-dimensional image display apparatus according to the present invention is higher than that of the conventional apparatus. That is, since the number of parallax images used in the apparatus according to the present invention is larger than that used in the conventional apparatus, it can be seen from Equation 3 that the size of the elementary three-dimensional space increases and the resolution is improved.

Figure 11:
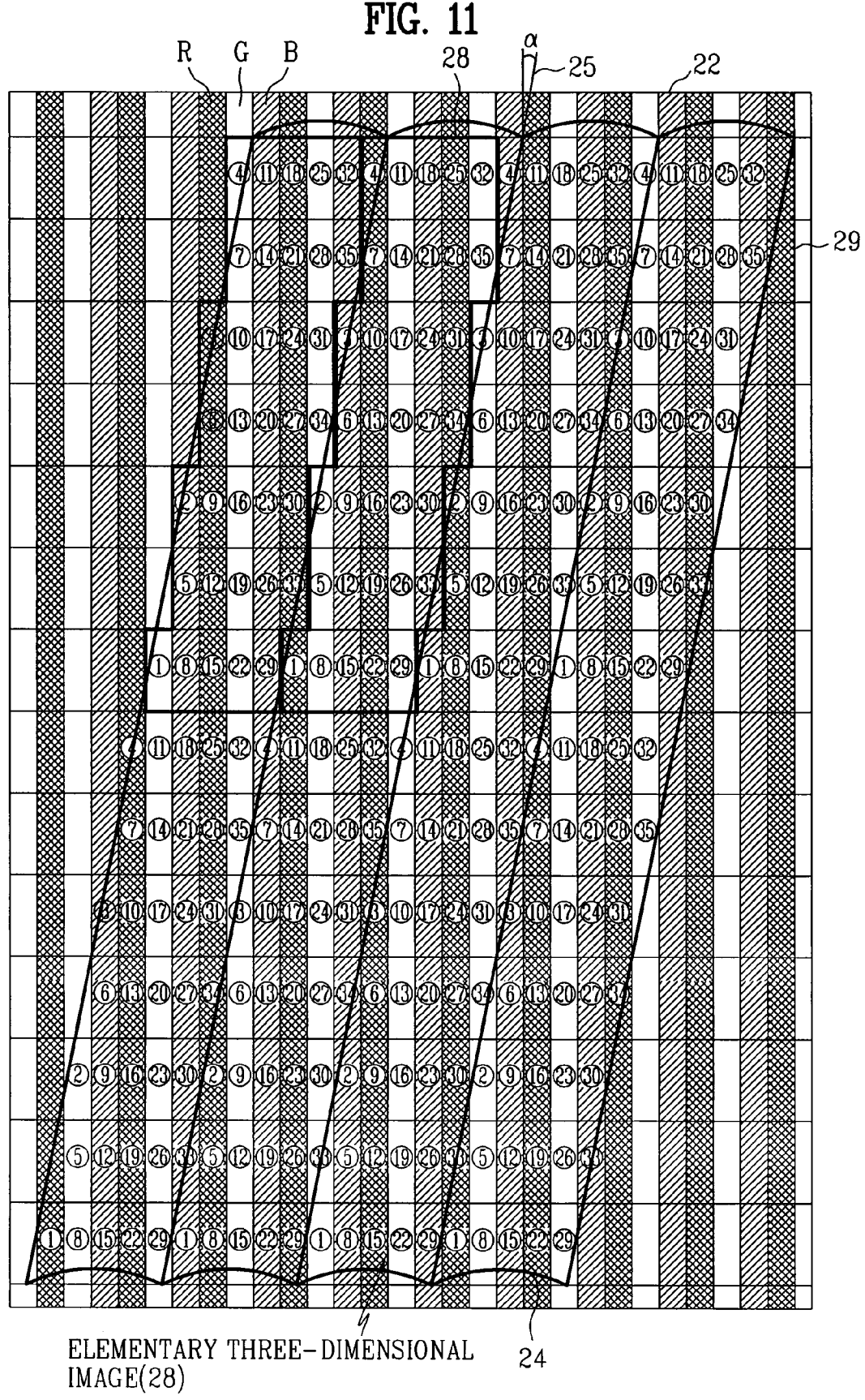
FIG. 11 is a view showing a second embodiment of the three-dimensional image display apparatus according to the present invention.

FIG. 11 is a view showing a second embodiment of the three-dimensional image display apparatus according to the present invention. As shown in FIG. 11, an elementary three-dimensional image 28 is generated using 7m (m is a natural number) parallax images. In the present embodiment, the number of parallax images used for generating the elementary three-dimensional image is 35, 42, 49 or 56. Among them, the number of parallax images is most preferably 35 in consideration of optimal resolution. Hereinafter, for convenience of description, the elementary three-dimensional image configured using 35 parallax images will be described.

As shown in FIG. 11, the elementary three-dimensional image 28 composed of 35 parallax images is repeatedly arranged on the flat display device 22 in the horizontal direction. In the vertical direction, the elementary three-dimensional image 28 is repeatedly arranged while being shifted in the left direction by 4 subpixels. That is, the elementary three-dimensional images, which are adjacent in the horizontal direction, are arranged without being shifted in all directions. In contrast, the elementary three-dimensional images, which are adjacent in the vertical direction, are arranged while being shifted by four subpixels in the left direction. Within the elementary three-dimensional image 28, the arrangement of the subpixels has the same pattern as described below. The 35 parallax images arranged in one elementary three-dimensional image are arranged in the subpixels arranged in an array of seven rows and five columns according to a predetermined rule. The 35 parallax images are sequentially arranged by repeatedly applying a pattern in which first five parallax images are arranged. That is, the rule of the five subpixels of a first row is also applied to six remaining rows.

In detail, the parallax images arranged at the leftmost side of each row are fourth, seventh, third, sixth, second, fifth and first parallax images which are sequentially arranged from an uppermost side to a lowermost side. The sequence number of the parallel image increases by 7 from the left side to the right side in each row. That is, within one elementary three-dimensional image, if a 5th parallax image is arranged in any subpixel, a 12th parallax image is arranged at the right side thereof.

In more detail, among the subpixels of the elementary three-dimensional image, 4th, 11th, 18th, 25th and 32nd parallax images are arranged in the subpixels of a first row from the left side to the right side, 7th, 14th, 21st, 28th and 35th parallax images are arranged in the subpixels of a second row, which are shifted from the subpixels of the first row in the left direction by one subpixel, from the left side to the right side, 3rd, 10th, 17th, 24th and 31st parallax images are arranged in the subpixels of a third row from the left side to the right side, 6th, 13th, 20th, 27th and 34th parallax images are arranged in the subpixels of a fourth row, which are shifted from the subpixels of the third row in the left direction by one subpixel, from the left side to the right side, 2nd, 9th, 16th, 23rd and 30th parallax images are arranged in the subpixels of a fifth row from the left side to the right side, 5th, 12th, 19th, 26th and 33rd parallax images are arranged in the subpixels of a sixth row, which are shifted from the subpixels of the fifth row in the left direction by one subpixel, from the left side to the right side, and 1st, 8th, 15th, 22nd and 29th parallax images are arranged in the subpixels of a seventh row from the left side to the right side.

When the parallax images are arranged as shown in FIG. 11, the vertical axis 25 of the lenticular lens plate 24 must be tilted from the vertical axis of the flat display device 22 by the predetermined angle α in order to display the 35 parallax images using one lenticular lens without deteriorating the resolution. At this time, the tilt angle α of the lenticular lens plate 24 may be calculated using a triangle 29 shown in FIG. 11 and is expressed by Equation 4.

$$\alpha = \arctan(5Hp/7Vp) \qquad \text{Equation 4}$$

where, Hp denotes a subpixel period in the horizontal direction and Vp denotes a subpixel period in the vertical direction.

Figure 12:
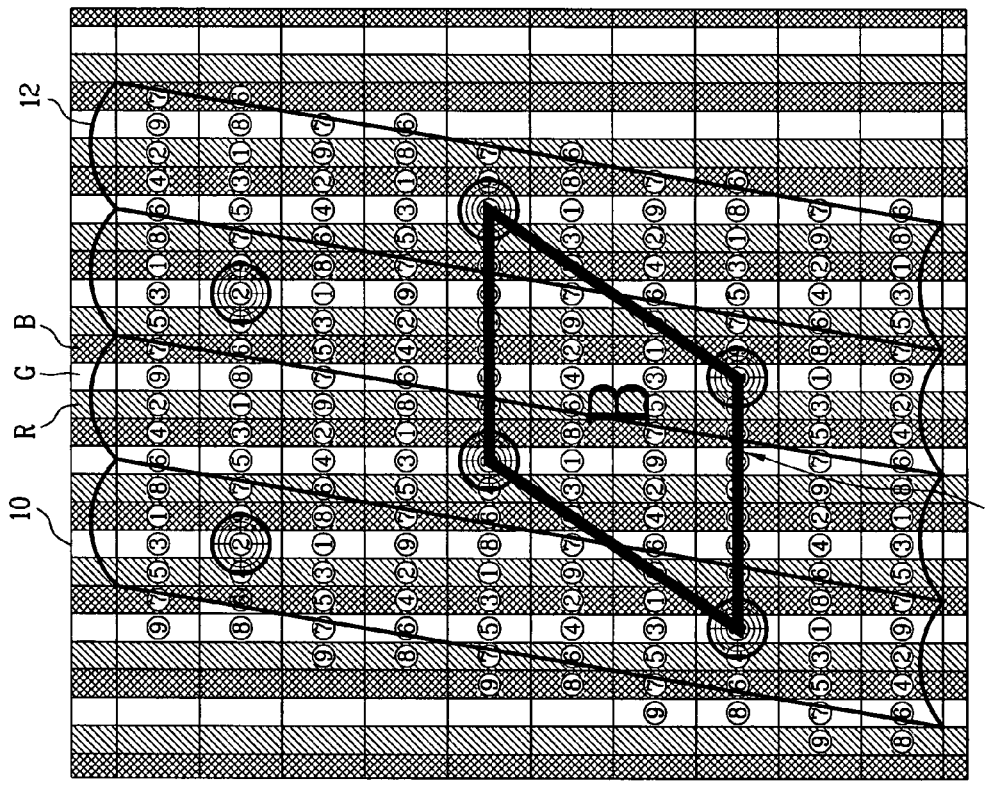
FIGS. 12(a) and 12(b) are views showing the comparison between the resolution of the second embodiment of the three-dimensional image display apparatus according to the present invention and the resolution of the conventional three-dimensional image display apparatus.
Figure 12:
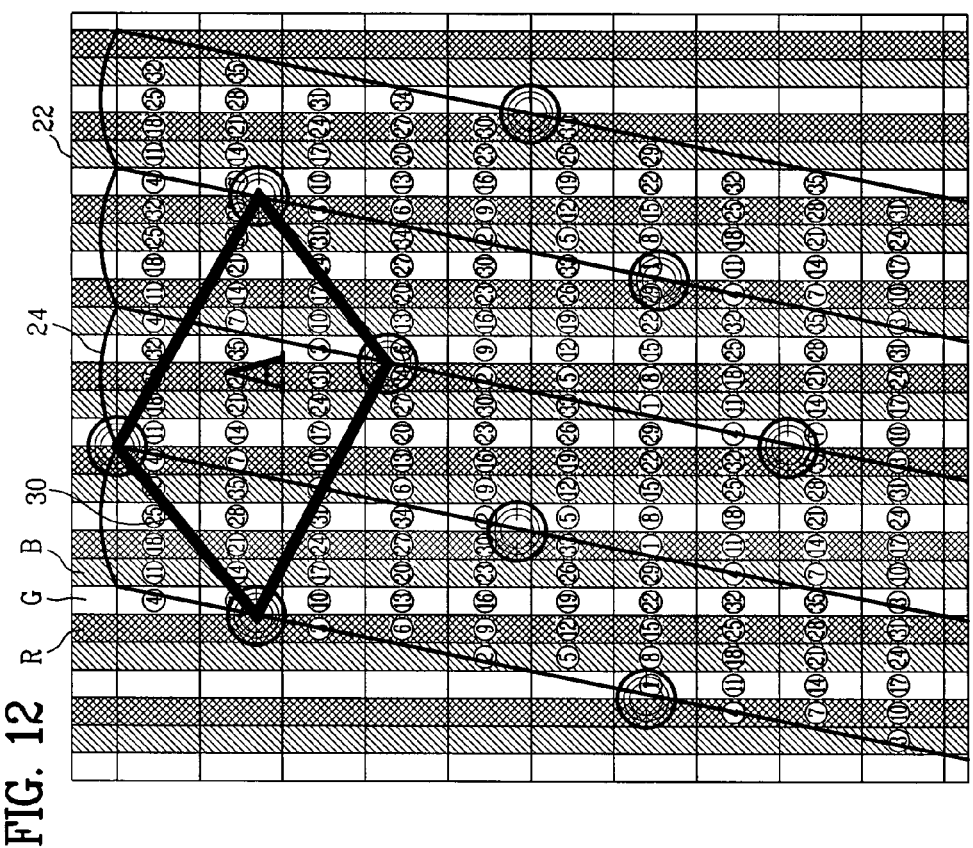

At this time, one lenticular lens 24a included in the lenticular lens plate 24 is formed in correspondence with five subpixels arranged in the horizontal direction. FIG. 12 is a view showing the comparison between the resolution of the three-dimensional image display apparatus according to the present invention and the resolution of the conventional three-dimensional image display apparatus. FIG. 12A shows a case where the elementary three-dimensional image is configured using 35 parallax images and the lenticular lens plate 24 is tilted by the angle calculated by Equation 4, according to the embodiment of the present invention. FIG. 12B shows a case where the elementary three-dimensional image is configured using 9 parallax images and the lenticular lens plate 12 is tilted by the angle calculated by Equation 1, according to the conventional three-dimensional image display apparatus. In FIGS. 12A and 12B, rectangles 30 and 32 indicate unit resolutions due to the effects of the lenticular lens plates 24 and 12, respectively. As an area A or B decreases, resolution increases.

As shown, since the area A of the unit resolution of the apparatus according to the present invention using the 35 parallax images is about 83% of the area B of the unit resolution of the conventional apparatus using the 9 parallax images, it can be seen that the resolution of the three-dimensional image display apparatus according to the present invention is higher than that of the conventional apparatus. That is, since the number of parallax images used in the apparatus according to the present invention is larger than that used in the conventional apparatus, it can be seen from Equation 4 that the size of the elementary three-dimensional space increases and the resolution is improved.

Figure 13:
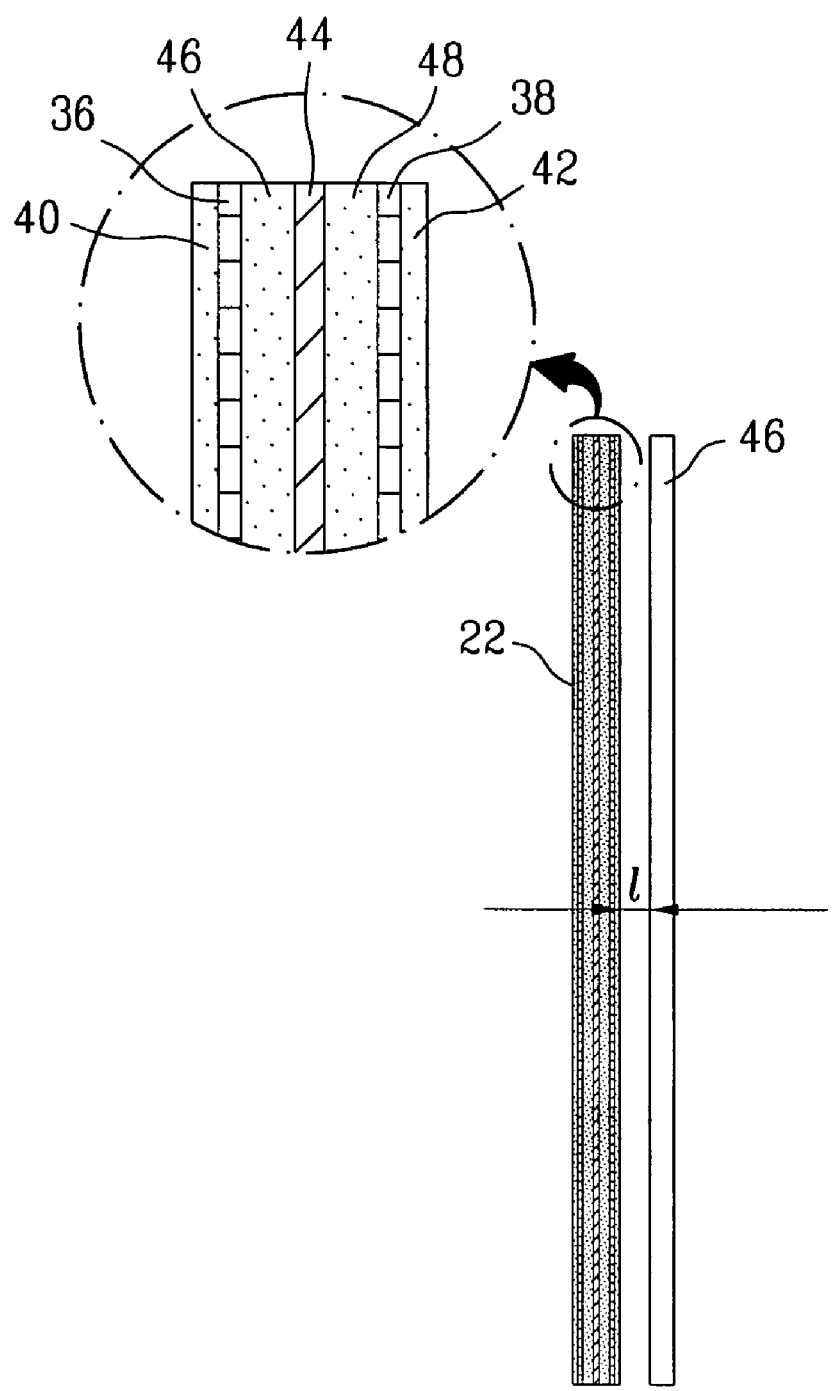
FIG. 13 is a view showing a third embodiment of the three-dimensional image display apparatus according to the present invention.

FIG. 13 is a view showing a third embodiment of the three-dimensional image display apparatus according to the present invention. As shown in FIG. 13, when the flat display device 22 is implemented by an LCD, a three-dimensional image display apparatus can prevent the LCD from being curved by attaching a support plate at the outside of the LCD. As shown, flat support plates 40 and 42 are attached to the outer surfaces of polarization plates 36 and 38 in the LCD of the three-dimensional image display apparatus according to the present embodiment. The flat support plates 40 and 42 are formed of transparent glass or transparent plastic, similar to transparent substrates 46 and 48 located outside a liquid crystal layer 44.

Although the flat support plates 40 and 42 are attached to the outer surfaces of the polarization plates 36 and 38 in the above-described embodiments, the flat support plate may be attached to any one of the outer surfaces of the polarization plates 36 and 38 in a modified embodiment. In the above-described three-dimensional image display apparatus, a slit array sheet may be used as a three-dimensional filter for dividing a plurality of parallax images, instead of the lenticular lens plate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A three-dimensional image display apparatus, comprising:
   a display device sampling, multiplexing, and displaying a plurality of parallax images so as to implement a three-dimensional image; and
   a lenticular lens plate provided on the display device and having a vertical axis tilted from a vertical axis of the display device by a predetermined angle $\propto$,
   wherein the number of parallax images included in an elementary three-dimensional image of the three-dimensional image corresponding to the lenticular lens plate having the vertical axis is a multiple of 5, and
   wherein the predetermined angle $\propto$ is obtained by $$\propto = \arctan(3Hp/5Vp)$$

(where, Hp denotes a subpixel period in a horizontal direction and Vp denotes a subpixel period in a vertical direction).

2. The three-dimensional image display apparatus according to claim 1, wherein the number of parallax images included in the elementary three-dimensional image of the three-dimensional image is five in a horizontal direction.

3. The three-dimensional image display apparatus according to claim 1, wherein the elementary three-dimensional image is repeatedly arranged in the horizontal direction and is repeatedly arranged in the vertical direction while being shifted by 3 columns.

4. The three-dimensional image display apparatus according to claim 1, wherein:
   the elementary three-dimensional image is configured by 25 parallax images, and
   the width of one lenticular lens included in the lenticular lens plate corresponds to five subpixels of the elementary three-dimensional image, which are arranged in the horizontal direction.

5. The three-dimensional image display apparatus according to claim 1, wherein the elementary three-dimensional image is configured by:
   arranging $3^{rd}$, $8^{th}$, $13^{th}$, $18^{th}$, and $23^{rd}$ parallax images in a first row from a right side to a left side,
   arranging $5^{th}$, $10^{th}$, $15^{th}$, $20^{th}$, and $25^{th}$ parallax images in a second row which is shifted from the first row by one subpixel in a left direction from the right side to the left side,
   arranging $2^{nd}$, $7^{th}$, $12^{th}$, $17^{th}$, and $22^{nd}$ parallax images in a third row from the right side to the left side,
   arranging $4^{th}$, $9^{th}$, $14^{th}$, $14^{th}$, $19^{th}$, and $24^{th}$ parallax images in a fourth row which is shifted from the third row by one subpixel in the left direction from the right side to the left side, and
   arranging $1^{st}$, $6^{th}$, $11^{th}$, $16^{th}$, and $21^{st}$ parallax images in a fifth row from the right side to the left side.

6. The three-dimensional image display apparatus according to claim 1, wherein the number of parallax images included in the elementary three-dimensional image of the three-dimensional image is eight in a horizontal direction.

7. The three-dimensional image display apparatus according to claim 1, wherein:
   the elementary three-dimensional image is configured by 40 parallax images, and
   the width of one lenticular lens included in the lenticular lens plate corresponds to eight subpixels of the elementary three-dimensional image, which are arranged in the horizontal direction.

8. The three-dimensional image display apparatus according to claim 1, wherein the elementary three-dimensional image is configured by:
   arranging $3^{rd}$, $8^{th}$, $13^{th}$, $18^{th}$, $23^{rd}$, $28^{th}$, $33^{rd}$, and $38^{th}$ parallax images in a first row from a right side to a left side,
   arranging $5^{th}$, $10^{th}$, $15^{th}$, $20^{th}$, $25^{th}$, $30^{th}$, $35^{th}$, and $40^{th}$ parallax images in a second row which is shifted from the first row by one subpixel in a left direction from the right side to the left side,
   arranging $2^{nd}$, $7^{th}$, $12^{th}$, $17^{th}$, $22^{nd}$, $27^{th}$, $32^{nd}$, and $37^{th}$ parallax images in a third row from the right side to the left side,
   arranging $4^{th}$, $9^{th}$, $14^{th}$, $19^{th}$, $24^{th}$, $29^{th}$, $34^{th}$, and $39^{th}$ parallax images in a fourth row which is shifted from the third row by one subpixel in the left direction from the right side to the left side, and
   arranging $1^{st}$, $6^{th}$, $11^{th}$, $16^{th}$, $21^{st}$, $26^{th}$, $31^{st}$, and $36^{th}$ parallax images in a fifth row from the right side to the left side.

9. A three-dimensional image display apparatus, comprising:
   a display device sampling, multiplexing, and displaying a plurality of parallax images so as to implement a three-dimensional image; and a lenticular lens plate provided on the display device and having a vertical axis tilted from a vertical axis of the display device by a predetermined angle $\alpha$, wherein the number of parallax images included in an elementary three-dimensional image of the three-dimensional image corresponding to the lenticular lens plate having the vertical axis is a multiple of 7, and wherein the predetermined angle $\alpha$ is obtained by $$\alpha = \arctan(5Hp/7Vp)$$

(where, Hp denotes a subpixel period in a horizontal direction and Vp denotes a subpixel period in a vertical direction).

10. The three-dimensional image display apparatus according to claim 9, wherein the number of parallax images included in the elementary three-dimensional image of the three-dimensional image is five in a horizontal direction.

11. The three-dimensional image display apparatus according to claim 9 wherein the elementary three-dimensional image is repeatedly arranged in the horizontal direction and is repeatedly arranged in the vertical direction while being shifted by 4 columns.

12. The three-dimensional image display apparatus according to claim 9, wherein:

the elementary three-dimensional image is configured by 35 parallax images, and the width of one lenticular lens included in the lenticular lens plate corresponds to five subpixels of the elementary three-dimensional image, which are arranged in the horizontal direction.

13. The three-dimensional image display apparatus according to claim 9, wherein the elementary three-dimensional image is configured by:

arranging $4^{th}$, $11^{th}$, $18^{th}$, $25^{th}$, and $32^{nd}$ parallax images in a first row from a first direction to a second direction, arranging $7^{th}$, $14^{th}$, $21^{st}$, $28^{th}$, and $35^{th}$ parallax images in a second row which is shifted from the first row by one subpixel in a left direction from the first direction to the second direction, arranging $3^{rd}$, $10^{th}$, $17^{th}$, $24^{th}$, and $31^{st}$ parallax images in a third row from the first direction to the second direction, arranging $6^{th}$, $13^{th}$, $20^{th}$, $27^{th}$, and $34^{th}$ parallax images in a fourth row which is shifted from the third row by one subpixel in the left direction from the first direction to the second direction, arranging $2^{nd}$, $9^{th}$, $16^{th}$, $23^{rd}$, and $30^{th}$ parallax images in a fifth row from the first direction to the second direction, arranging $5^{th}$, $12^{th}$, $19^{th}$, $26^{th}$, and 33rd parallax images in a sixth row which is shifted from the fifth row by one subpixel in the left direction from the first direction to the second direction, and arranging $1^{st}$, $8^{th}$, $15^{th}$, $22^{nd}$, and $29^{th}$ parallax images in a seventh row from the first direction to the second direction.

14. The three-dimensional image display apparatus according to claim 9, wherein:

the display device is a liquid crystal display panel (LCD), and a light source is further included.

15. The three-dimensional image display apparatus according to claim 9, wherein the display device is a plasma display panel (PDP).

* * * * *